United States Patent
Choi et al.

(10) Patent No.: US 7,436,461 B2
(45) Date of Patent: Oct. 14, 2008

(54) LIQUID CRYSTAL DISPLAY DEVICE

(75) Inventors: Woo Hyuk Choi, Kyungsangbuk-do (KR); Kwang Seop Park, Kyungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 113 days.

(21) Appl. No.: 09/739,825

(22) Filed: Dec. 20, 2000

(65) Prior Publication Data

US 2001/0024245 A1     Sep. 27, 2001

(30) Foreign Application Priority Data

Dec. 30, 1999    (KR) .......................... 10-1999-65977

(51) Int. Cl.
  *G02F 1/136*  (2006.01)
  *G02F 1/1343*  (2006.01)
(52) U.S. Cl. .......................... 349/42; 349/139; 349/143
(58) Field of Classification Search ............. 349/42–43, 349/143, 139; 257/59, 72
  See application file for complete search history.

(56) References Cited

U.S. PATENT DOCUMENTS

| | | | | |
|---|---|---|---|---|
| 5,416,619 A | * | 5/1995 | Koike | 349/42 |
| 5,585,951 A | * | 12/1996 | Noda et al. | 349/122 |
| 6,087,730 A | * | 7/2000 | McGarvey et al. | 257/766 |
| 6,508,686 B2 | * | 1/2003 | Adachi | 445/24 |
| 6,556,264 B1 | * | 4/2003 | Hirakata et al. | 349/110 |
| 6,900,854 B1 | * | 5/2005 | Kim et al. | 349/43 |
| 2001/0024245 A1 | * | 9/2001 | Choi et al. | 349/43 |
| 2004/0174482 A1 | * | 9/2004 | Oke et al. | 349/139 |

* cited by examiner

*Primary Examiner*—Dung T. Nguyen
(74) *Attorney, Agent, or Firm*—Birch, Stewart, Kolasch & Birch, LLP

(57) ABSTRACT

A liquid crystal display device is formed wherein pattern defects generated during the process are eliminated to reduce the need for repairs. In the device, a trench-shaped hole is defined by patterning a passivation layer and a gate-insulating layer at the peripheries of a gate line and a data line to expose a transparent substrate. Accordingly, a protruding defect portion at the pixel area caused by pattern defects in the semiconductor layer and the gate line is removed by the trench-shaped holes defined by patterning the passivation layer and the gate insulating layer at the peripheries of the gate line and the data line, so that a separate repair process is not required.

29 Claims, 4 Drawing Sheets

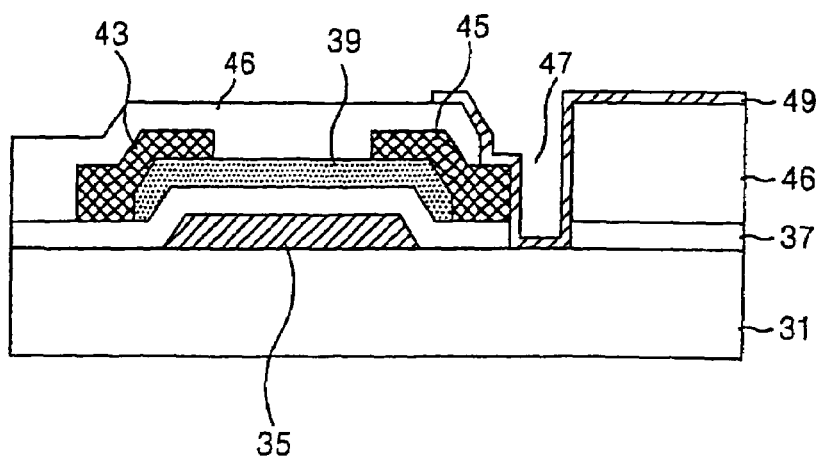
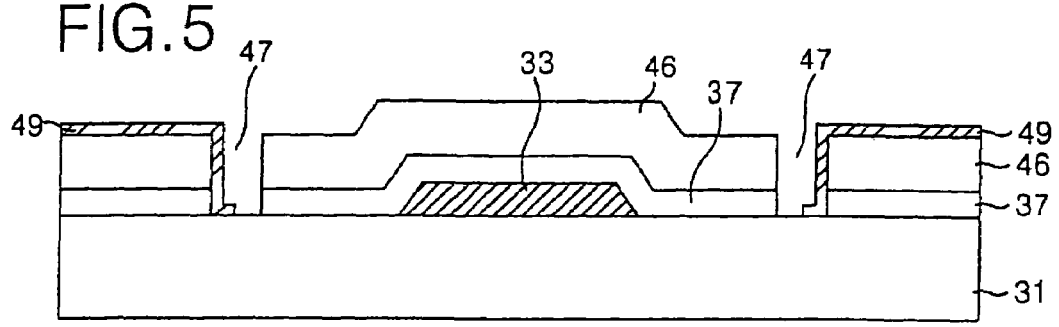
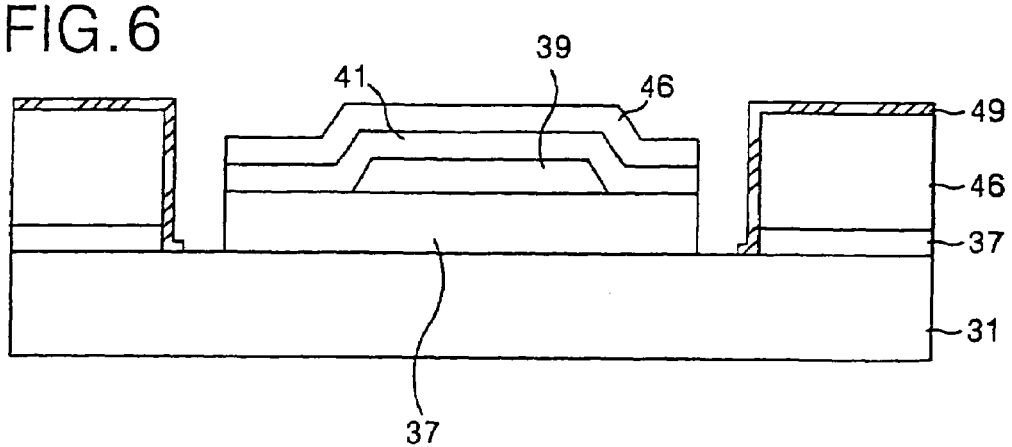

LIQUID CRYSTAL DISPLAY DEVICE

BACKGROUND OF THE INVENTION

1. Field of the Invention

This invention relates to a liquid crystal display, and more particularly, to a liquid crystal display device wherein pattern defects generated during the formation process are eliminated to reduce the need for repairs.

2. Description of the Related Art

Generally, a liquid crystal display (LCD) has a structure in which unit pixels are arranged horizontally and vertically each of the unit pixels includes a switching device consisting of a thin film transistor (TFT) and a pixel electrode for controlling a liquid crystal injected between substrates to transmit or reflect an incident light.

In the LCD, N×M unit pixels (wherein N and M are integers), each of which consists of a thin film transistors as a switching device and a pixel electrode coupled with the thin film transistor, are vertically and horizontally arranged in a matrix. N gate lines and M data lines transmitting signals to the gate electrodes and the source electrodes of the thin film transistors, respectively, are formed in such a manner to cross each other.

FIG. 1 is a plan view showing a structure of an LCD of the related art, and FIG. 2 is a section view of the related art LCD taken along the II-II' line in FIG. 1. Referring to FIG. 1 and FIG. 2, in the related art LCD, N gate lines 13 and M data lines 21 are formed on a transparent substrate 11 in such a manner to cross each other, thereby defining N×M pixel areas. The gate lines 13 and the data lines 21 are made from a metal and have a gate insulating layer 17 therebetween to be electrically insulated from each other. The N×M pixel areas include N×M pixels, each of which is driven with a TFT as a switching device connected electrically to the gate line 13 and the data line 21.

The TFT consists of a gate electrode 15, a source electrode 23, a drain electrode 25, and a semiconductor layer 19 including an ohmic contact layer (not shown) and an active layer (not shown). The gate electrode 15 is connected to the gate line 13 while the source electrode 23 is connected to the data line 21. The drain electrode 25 is opposed to the source electrode 23 with the gate electrode 15 therebetween. The semiconductor layer 19 is formed on the gate insulating layer 17 in such a manner as to overlap the gate electrode 15 and the source and drain electrodes 23 and 25 of the TFT as well as the data line 21.

A passivation layer 26 is provided to cover the TFT having the structure as mentioned above. A transparent pixel electrode 29 electrically connected to the drain electrode 25 via a contact hole 27 is provided at a pixel area on the passivation layer 26.

However, the related art LCD has a problem in that, since it must be repaired upon the generation of pattern defects in the gate line and the semiconductor line, its process time is increased.

SUMMARY OF THE INVENTION

Accordingly, it is an object of the present invention to provide a liquid crystal display device wherein pattern defects in a gate line and a semiconductor layer can be eliminated.

In order to achieve these and other objects of the invention, a liquid crystal display device according to an embodiment of the present invention includes a trench-shaped hole defined by patterning a passivation layer and a gate insulating layer at the peripheries of a gate line and a data line to expose a transparent substrate.

BRIEF DESCRIPTION OF THE DRAWINGS

These and other objects of the invention will be apparent from the following detailed description of the embodiments of the present invention with reference to the accompanying drawings, in which:

FIG. 4 is a section view of the liquid crystal display device taken along the IV-IV' line in FIG. 3;

FIG. 5 is a section view of the liquid crystal display device taken along the V-V' line in FIG. 3; and FIG. 6 is a section view of the liquid crystal display device taken along the VI-VI' line in FIG. 3.

DETAILED DESCRIPTION OF THE PREFERRED EMBODIMENT

Figure 1:
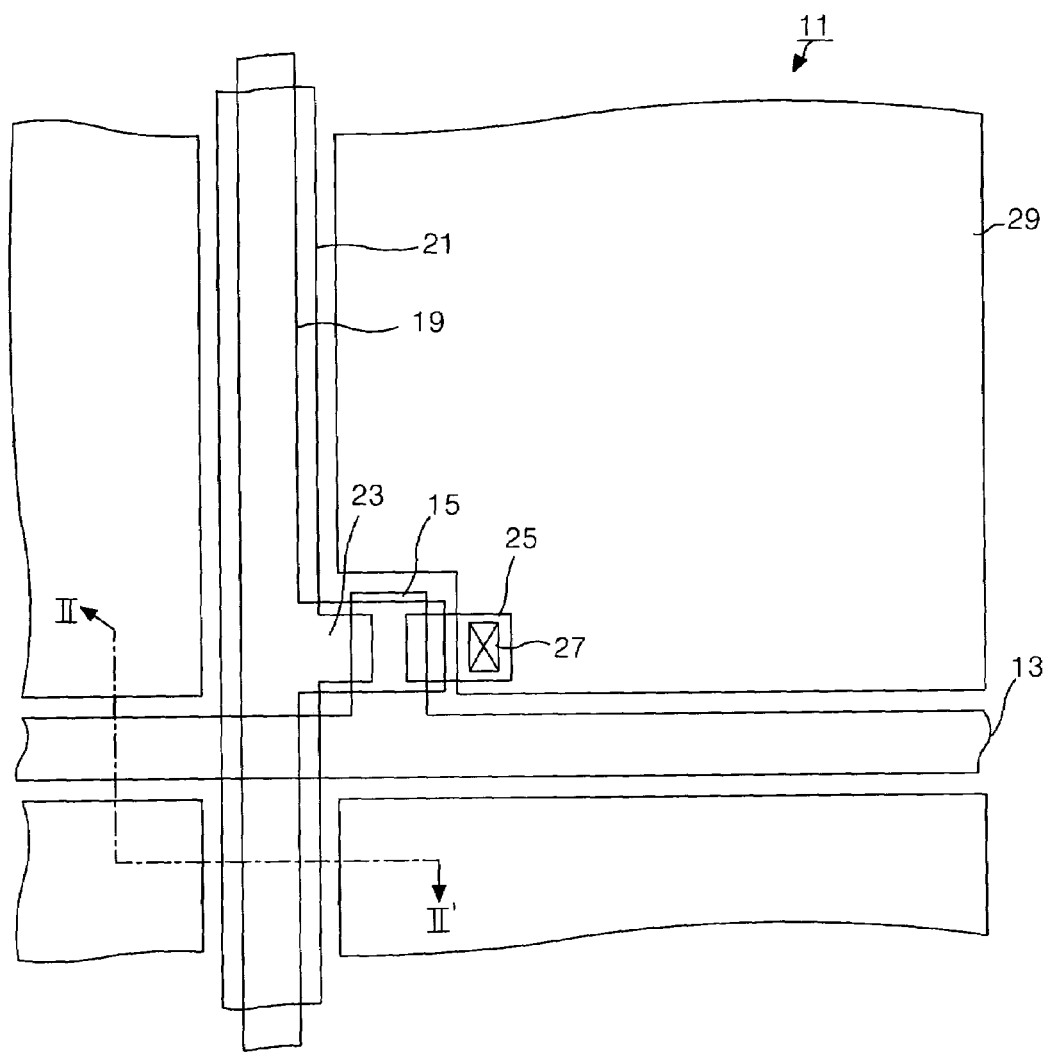
FIG. 1 is a plan view showing a structure of a related art liquid crystal display device.
Figure 2:
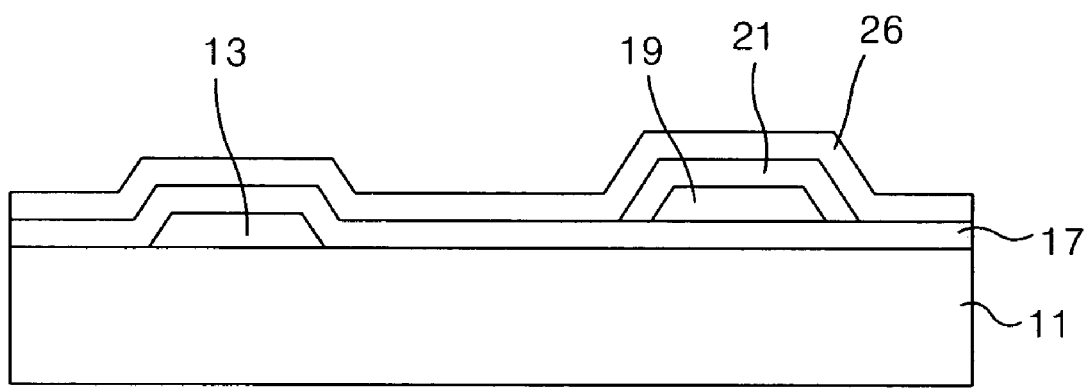
FIG. 2 is a section view of the related art liquid crystal display device taken along the II-II' line in FIG. 1.
Figure 3:
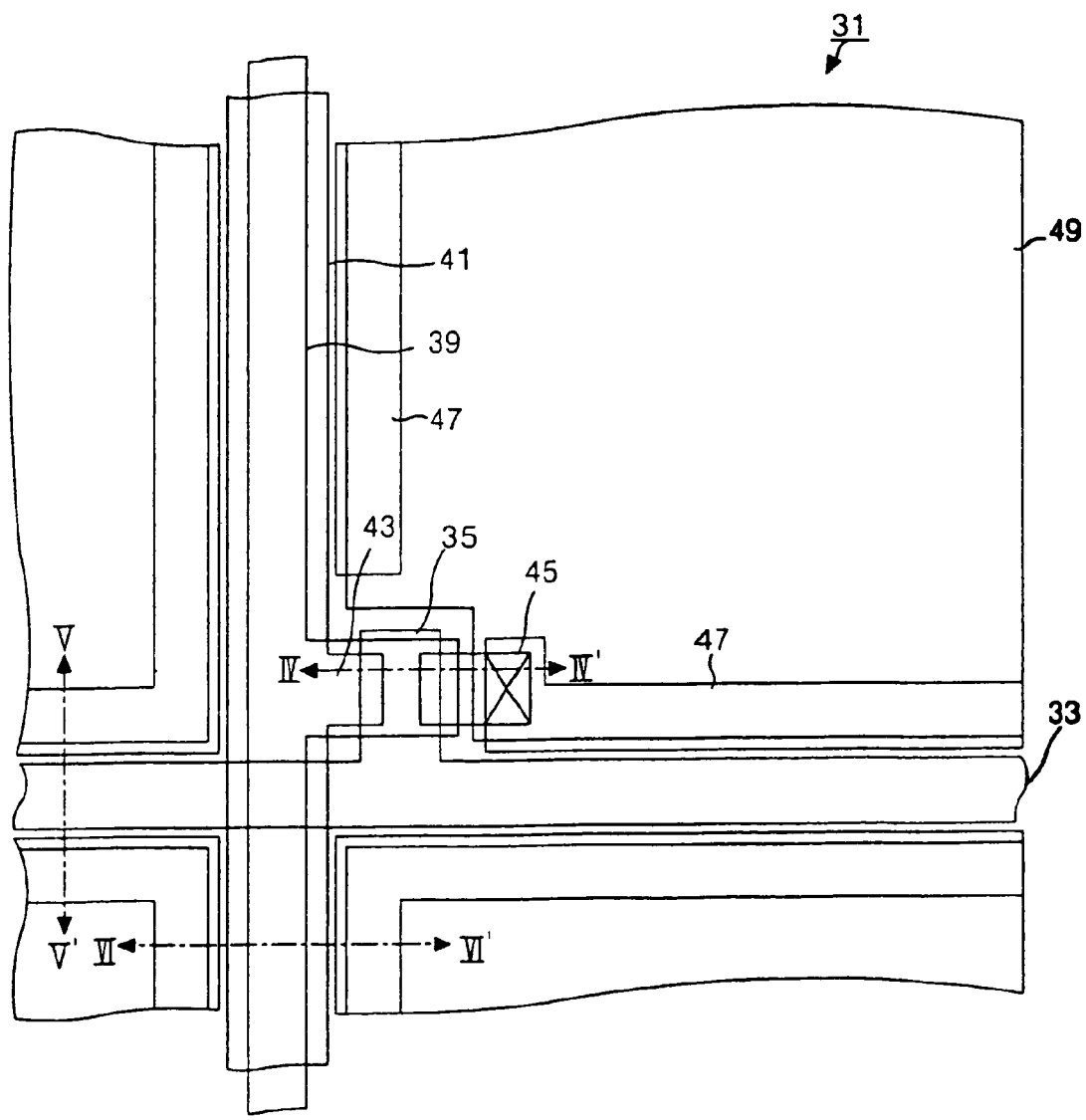
FIG. 3 is a plan view showing a structure of a liquid crystal display device according to an embodiment of the present invention.

Referring to FIGS. 3-6, there is shown a liquid crystal display device according to an embodiment of the present invention. In the liquid crystal display device, N gate lines 33 and M data lines 41 are formed on a transparent substrate 31 in such a manner to cross each other, thereby defining N×M pixel areas. The gate lines 33 and the data lines 41 are made from a conductive metal and have a gate insulating layer 37 made from an insulating material such as silicon oxide or silicon nitride therebetween to be electrically insulated from each other. The N×M pixel areas includes N×M pixels, each of which is driven with a TFT as a switching device connected electrically to the gate line 33 and the data line 41.

The TFT consists of a gate electrode 35, a source electrode 43, a drain electrode 45, and a semiconductor layer 39 including an ohmic contact layer (not shown) and an active layer (not shown). The gate electrode 35 is connected to the gate line 33 while the source electrode 43 is connected to the data line 41. The drain electrode 45 is opposed to the source electrode 43 with the gate electrode 35 therebetween.

The semiconductor layer 39 has an active layer (not shown) made from polycrystalline silicon or amorphous silicon that is not doped with an impurity, and an ohmic contact layer (not shown) made from polycrystalline silicon or amorphous silicon doped with a n-type or p-type impurity. The active layer (not shown) constituting the semiconductor layer 39 between the drain electrode 45 and the source electrode 43 makes a channel. The semiconductor layer 39 is formed on the gate insulating layer 37 in such a manner as to overlap the gate electrode 35 and the source and drain electrodes 43 and 45 of the TFT as well as the data line 41. A passivation layer 46 is provided to cover the TFT having the structure as mentioned above.

French-shaped holes 47 are provided at the peripheries of the gate line 33 and the data line 41. The trench-shaped holes 47 expose the drain electrode 45 and are defined by patterning the passivation layer 46 and the gate insulating film 37 by photolithography including a dry etching to expose the transparent substrate 31. When the trench-shaped holes 47 are formed, a protruding defect portion at the pixel area caused by pattern defects in the semiconductor layer 39 and the gate line 33 is also thereby removed, so that a separate repair process is not required.

A transparent pixel electrode 49 electrically connected, via the trench-shaped holes 47, to the exposed drain electrode 45, is provided at the pixel area on the passivation layer 46.

As described above, according to the present invention, a protruding defect portion at the pixel area caused by pattern defects in the semiconductor layer and the gate line is removed by the trench-shaped holes defined by patterning the passivation layer and the gate insulating layer at the peripheries of the gate line and the data line, so that a separate repair process is not required.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
a transparent substrate, at least one thin film transistor having a gate electrode, a gate insulating layer over the gate electrode, a semiconductor layer, a source electrode and a drain electrode, a passivation layer located on the at least one thin film transistor, a pixel electrode connected to the drain electrode of the at least one thin film transistor, a gate line connected to the gate electrode of the at least one thin film transistor, a data line connected to the source electrode of the at least one thin film transistor;
a first trench-shaped hole formed in the passivation layer and the gate insulating layer along a first side of at least one of the data line and the gate line between the pixel electrode and the at least one of the data line and the gate line to expose the transparent substrate, the pixel electrode in the first trench exposing the transparent substrate; and
a second trench-shaped hole formed in the passivation layer and the gate insulating layer along a second, opposite side of the at least one of the data line and the gate line,
wherein the first and second trench-shaped holes expose the substrate.

2. The liquid crystal display device according to claim 1, wherein the drain electrode is exposed by the first trench-shaped hole.

3. The liquid crystal display device according to claim 1, wherein the first and second trench-shaped holes are formed by patterning the passivation layer and the gate insulating layer.

4. The liquid crystal display device according to claim 1, wherein the first and second trench-shaped holes extend along a majority of the at least one of the gate line and the data line.

5. The liquid crystal display device according to claim 1, wherein the first and second trench-shaped holes extend parallel to the at least one of the gate line and the data line.

6. The liquid crystal display device according to claim 1, wherein the second trench-shaped hole is formed between an adjacent pixel electrode and the second, opposite side of the at least one of the data line and the gate line.

7. The liquid crystal display device according to claim 1, wherein the first trench-shaped hole exposes a portion of the transparent substrate, and the portion of the transparent substrate exposed to the first trench-shaped hole is free of contact with the pixel electrode.

8. A liquid crystal display structure, comprising:
a substrate;
a gate line formed on the substrate and connected to a thin film transistor;
a data line formed on the substrate and crossing the gate line and connected to the thin film transistor;
a pixel electrode located adjacent to the gate line and the data line and connected to the thin film transistor;
a first trench located along a first side of at least one of the data line and the gate line between the pixel electrode and the at least one of the data line and the gate line, the pixel electrode in the first trench exposing the substrate; and
a second trench located along a second, opposite side of the at least one of the data line and the gate line.

9. The liquid crystal display structure according to claim 8, further comprising a gate insulating layer formed over the gate line, wherein the first and second trenches extend through the gate insulating layer and expose the substrate.

10. The liquid crystal display structure according to claim 8, wherein the first and second trenches extend along a majority of the at least one of the gate line and the data line.

11. The liquid crystal display structure according to claim 8, wherein the first and second trenches extend parallel to the at least one of the gate line and the data line.

12. The liquid crystal display structure according to claim 8, wherein the thin film transistor is located on the substrate.

13. The liquid crystal display structure according to claim 12, wherein the thin film transistor comprises:
a gate electrode connected with the gate line;
a source electrode connected with the data line; and
a drain electrode connected with the pixel electrode.

14. The liquid crystal display structure according to claim 8, wherein the second trench is located between an adjacent pixel electrode and the second, opposite side of the at least one of the data line and the gate line.

15. A liquid crystal display device, comprising:
a substrate;
a thin film transistor located on the substrate;
a bus line formed on the substrate and connected with the thin film transistor;
a pixel electrode located adjacent to the bus line and connected with the drain electrode of the thin film transistor;
a first trench extending along a first side of the bus line and between the pixel electrode and the bus line, the pixel electrode in the first trench exposing the substrate; and
a second trench extending along a second, opposite side of the bus line.

16. The liquid crystal display device according to claim 15, wherein the bus line comprises a gate line, and further comprising a gate insulating layer formed over the gate line, wherein the first trench and the second trench extend through the gate insulating layer and expose the substrate.

17. The liquid crystal display device according to claim 16, further comprising:
a data line formed on the substrate and connected with the thin film transistor;
a third trench extending along a first side of the data line and between the pixel electrode and the data line; and
a fourth trench extending along a second, opposite side of the data line.

18. The liquid crystal display device according to claim 17, wherein the thin film transistor comprises:
the gate electrode being connected with the gate line;

the source electrode being connected with the data line; and a drain electrode connected with the pixel electrode.

19. The liquid crystal display device according to claim 15, wherein the second trench is located between an adjacent pixel electrode and the second, opposite side of the bus line.

20. The liquid crystal display device according to claim 15, wherein the first and second trenches extend along a majority of the bus line.

21. A method of making a liquid crystal display structure, comprising the following steps:

provide a substrate;

forming a gate line on the substrate to be connected to a thin film transistor;

forming a data line on the substrate which crosses the gate line and is connected to the thin film transistor;

forming a pixel electrode adjacent to the gate line and the data line to be connected to the thin film transistor;

forming a first trench along a first side of at least one of the data line and the gate line and between the pixel electrode and the at least of the data line and gate line, the pixel electrode in the first trench exposing the substrate; and forming a second trench along a second, opposite side of the at least one of the data line and the gate line.

22. The method according to claim 21, further comprising the step of forming the thin film transistor on the substrate.

23. The method according to claim 22, wherein the step of forming the thin film transistor further comprises the following substeps:

forming a gate electrode connected with the gate line;

forming a source electrode connected with the data line; and forming a drain electrode with the pixel electrode.

24. The method according to claim 23, further comprising the step of forming a contact hole to expose the drain electrode for contact with the pixel electrode.

25. The method according to claim 24, wherein the first and second trenches are formed during the step of forming the contact hole.

26. The method according to claim 21, wherein the first trench and the second trench exposing the substrate.

27. The method according to claim 21, wherein the step of forming the second trench includes forming the second trench between an adjacent pixel electrode and the second, opposite side of the at least one of the data line and the gate line.

28. The method according to claim 21, wherein the step of forming the first trench includes forming the first trench to expose the substrate, and the step of forming the pixel electrode includes exposing at least a portion of the substrate exposed in the step of forming the first trench.

29. The method according to claim 21, wherein the steps of forming the first and second trenches include forming the first and second trenches extending along a majority of the at least one of the gate line and the data line.

* * * * *